United States Patent
Mavanur et al.

(10) Patent No.: US 12,100,583 B2
(45) Date of Patent: Sep. 24, 2024

(54) ELECTROSPRAY ION SOURCE FOR SPECTROMETRY USING INDUCTIVELY HEATED GAS

(71) Applicant: Bruker Scientific LLC, Billerica, MA (US)

(72) Inventors: Anil Mavanur, Littleton, MA (US); Felician Muntean, Andover, MA (US)

(*) Notice: Subject to any disclaimer, the term of this patent is extended or adjusted under 35 U.S.C. 154(b) by 0 days.

(21) Appl. No.: 18/459,616

(22) Filed: Sep. 1, 2023

(65) Prior Publication Data
US 2023/0411137 A1    Dec. 21, 2023

Related U.S. Application Data

(62) Division of application No. 17/313,131, filed on May 6, 2021, now Pat. No. 11,784,036.

(60) Provisional application No. 63/031,837, filed on May 29, 2020.

(51) Int. Cl.
*A61B 6/10* (2006.01)
*G01N 27/623* (2021.01)
*H01J 49/16* (2006.01)

(52) U.S. Cl.
CPC .......... *H01J 49/167* (2013.01); *G01N 27/623* (2021.01)

(58) Field of Classification Search
CPC .. H01J 49/00; H01J 49/02; H01J 49/10; H01J 49/167; H01J 49/0468; H01J 49/165; H01J 49/0422; H01J 49/044; G01N 27/623
USPC .......................................... 250/281, 282, 288
See application file for complete search history.

(56) References Cited

U.S. PATENT DOCUMENTS

| | | | | |
|---|---|---|---|---|
| 2009/0194687 A1* | 8/2009 | Jolliffe | ..................... | H01J 49/10 250/288 |
| 2011/0183431 A1* | 7/2011 | Covey | ..................... | H01J 49/26 250/282 |
| 2012/0103062 A1* | 5/2012 | Hsiao | ....................... | G01N 1/44 250/288 |

FOREIGN PATENT DOCUMENTS

| GB | 2590175 | 6/2021 |
| WO | 2015040391 A1 | 3/2015 |

* cited by examiner

*Primary Examiner* — Jason L McCormack
(74) *Attorney, Agent, or Firm* — Benoît & Côté, Inc.

(57) ABSTRACT

The invention relates to the generation of desolvated ions by electrospraying to be investigated analytically, e.g. according to the charge-related mass m/z and/or ion mobility. The cloud of highly charged droplets drawn from the spray capillary by a high voltage is usually focused and stabilized by a beam of nebulizing gas surrounding the cloud of tiny droplets. For a fast drying of the droplets, an additional desolvation gas is usually heated to a temperature of up to several hundred degrees centigrade and blown into the cloud of droplets. The invention particularly relates to the heating of the gas which is instrumental in the generation of desolvated ions as part of the electrospraying process without any mechanical or electrical contact between the heating power supply and the heater itself, but rather by heating the heater for the gas using electromagnetic induction.

9 Claims, 7 Drawing Sheets

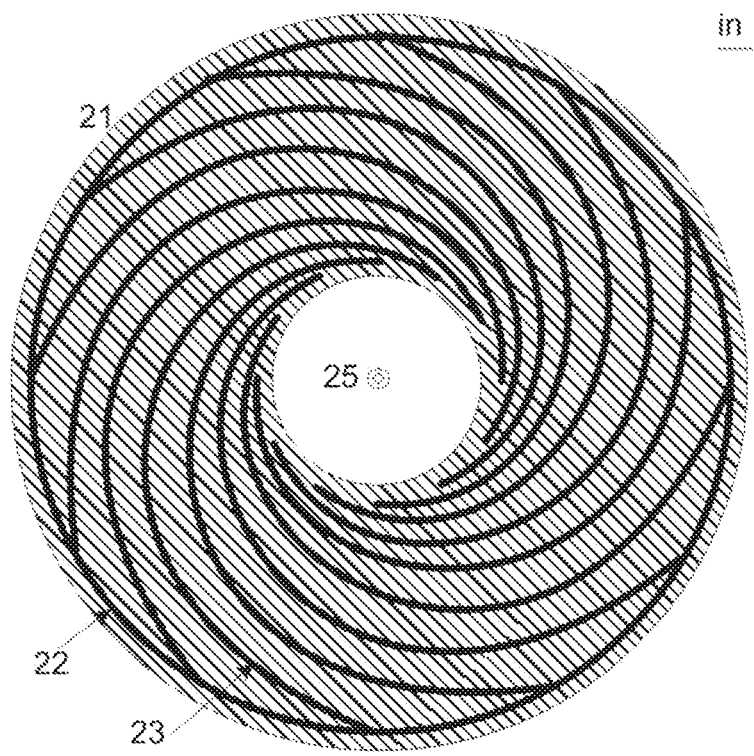
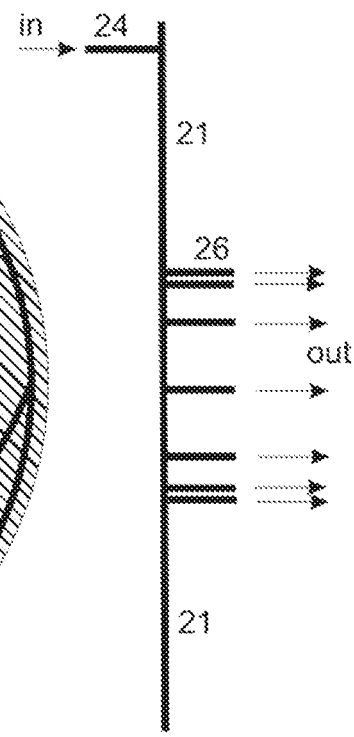
Figure 4
Figure 5
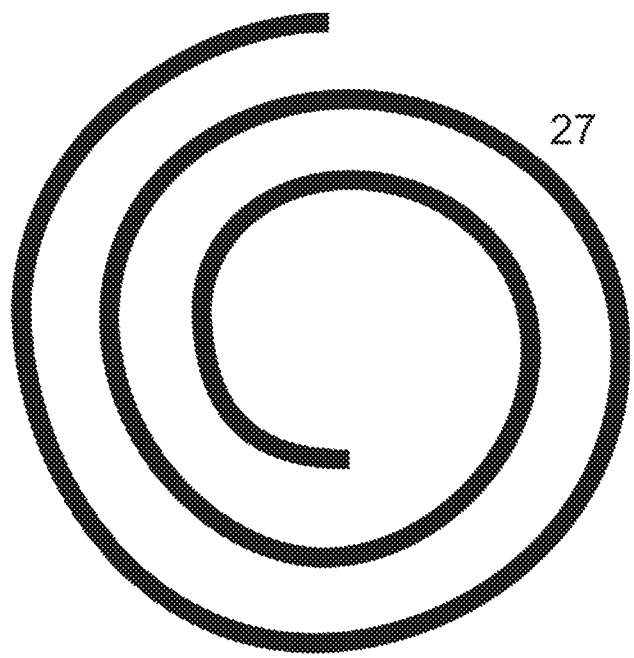
Figure 6

ELECTROSPRAY ION SOURCE FOR SPECTROMETRY USING INDUCTIVELY HEATED GAS

BACKGROUND OF THE INVENTION

Field of the Invention

The invention relates to the generation of desolvated ions by electrospraying in a mass spectrometric and/or ion mobility spectrometric ion source. The cloud of highly charged droplets drawn from the spray capillary by a high voltage is usually focused and stabilized by a beam of inert nebulizing gas surrounding the cloud of tiny droplets. For a fast drying of the droplets, a second gas stream, called desolvation gas, usually heated to a temperature of up to several hundred degrees centigrade, such as between 300° C. and 500° C., is blown into the spray cloud. The invention particularly relates to the heating procedure of a gas which is instrumental in the generation of desolvated ions.

Description of the Related Art

In electrospray ion sources, ions of analyte molecules are generated by spraying a solution of the analyte substance by applying a high voltage in the order of four kilovolts to a spray capillary, forming a high electric drawing field for the liquid at the tip of the capillary. A Nobel Prize for Chemistry was awarded to J. B. Fenn in 2002 for the development of this type of ion source. Mixtures of water with organic liquids like methanol or acetonitrile are mostly used as solvents. The procedure forms a cloud of highly charged droplets (an aerosol) accelerated by the field away from the tip of the capillary, thereby forming a wide-angle conical beam by the space charge inside the cloud. The solvent evaporates from a charged droplet until it becomes unstable upon reaching its Rayleigh limit. At this point, the droplet deforms as the electrostatic repulsion of like charges, in an ever-decreasing droplet size, becomes more dominant than the surface tension holding the droplet together. The droplet undergoes Coulomb fission, whereby the original droplet 'explodes' creating many smaller droplets. The new droplets undergo desolvation and subsequently further Coulomb fissions. Charged molecular ions remain, either by direct ejection from the droplets, or by complete drying of the droplets. These ions may be investigated by mass spectrometry, by ion mobility spectrometry or by a combination of both.

To reduce the angle of the spray cone and to stabilize the spray process, a chemically inert nebulizing gas (or "sheath gas") is blown sharply parallel to the spray direction, fully surrounding the cloud of droplets. In most cases, nitrogen is used as nebulizing gas. The nebulizing gas usually is not heated. It is guided by a tube to the tip of the spray capillary, the tube usually being arranged concentrically around the spray capillary. This arrangement keeps the analyte-containing solution inside the spray capillary at low temperature, thus avoiding the formation of gas bubbles which would be detrimental to the functioning of the electrosprayer.

The spray cloud consists of tiny droplets which have to be evaporated until the analyte ions are completely desolvated. For this drying of the droplets, thermal energy is required. The thermal energy can be supplied by a further gas stream, called desolvation gas. This inert gas, in most cases nitrogen, may be blown by jet nozzles from the side into the spray cloud. This desolvation gas usually is heated to up to a few hundred centigrade by passing tiny channels within a heating block, the heating block being brought to temperature typically by an electric resistance heater in close contact with the heating block.

Because of the high voltage used for the spraying process, this type of resistance heating for the desolvation gas is not very satisfactory. There is hence a need for a more effective, easy-to-install heating procedure for gas in an electrospray ion source for analytical spectrometry.

The U.S. Pat. No. 6,681,998 B2, however pertaining to the field of administering aerosolized medicinal liquids or powder and therefore being unrelated to the field of analytical investigations, describes an aerosol generator including an induction heating arrangement to vaporize fluid, such as liquid or powder, contained in a fluid passage.

The international application WO 2015/040391 A1 discloses an apparatus for a mass spectrometer, comprising an ion source, a heater for heating a gas flow to the ion source, a temperature sensor for monitoring the temperature of the heater, and a control system which determines a flow rate of the gas flow by monitoring the power supplied to the heater and the temperature of the heater.

The application publication US 2016/0336156 A1 discloses a method of introducing ions into a mass spectrometer, where a sample is ionized using e.g. an electrospray ion source to form a plurality of ions that are transported in a gas through a passageway, which may comprise an inductively heated capillary, and into an inlet of a mass spectrometer. The said inductively heated capillary has however no bearing on the functioning of the ion source.

BRIEF SUMMARY OF THE INVENTION

The invention provides a method to heat a gas that is instrumental in the generation of desolvated ions as part of the electrospraying process without any mechanical contact between the heating power supply and the heating device itself, using rather electromagnetic induction. A conductive element having a plurality of windings, such as a coil or spiral (which may be called a flat "pancake" coil), is supplied with an AC current in the kilohertz-megahertz range; the electromagnetic field inside the conductive element having a plurality of windings induces heat in an electrically conductive heater for the gas heating device by the generation of eddy currents. The inductively heated heating device may be simply a metallic or otherwise conductive block, e.g. a cylinder surrounding the spray capillary, with channels for the passage of gas. Alternatively, it may be just a bundle of metallic or otherwise conductive capillaries directly heated by induction, e.g. inside a non-conductive cylinder, such as a ceramic cylinder; or, in another variant, it may be a filling inside non-conductive channels for the gas, such as porous conductive material, e.g. bundles of metal or otherwise conductive wool. The heating device may also be a thin plate with gas channels, heated by an adjacent flat conductive element having a plurality of windings, such as a spiral, the thin plate surrounding the spray capillary and, due to its short coaxial extension, transferring only little heat to the capillary and the analyte solution therein, exposure of which to heat is generally undesired.

In a first aspect, the invention proposes an electrospray ion source for generating desolvated ions to be investigated analytically, having a spray capillary supplied with a spray solution, a first power supply for the generation of an electric drawing field at a tip of the spray capillary for establishing conditions for electrospraying, and a supply of gas which is instrumental in the generation of desolvated ions, and further comprising a heater device through which the gas is conducted towards the sprayed solution, a conductive element having a plurality of windings, such as a coil or spiral, near the heater device, and a second power supply connected to the conductive element having a plurality of windings to generate heat in the heater device by electromagnetic induction in order that the gas is heated while passing the heater device on its way to the sprayed solution.

In various embodiments, the heater device through which the gas is conducted towards the sprayed solution is preferably arranged and configured such that heated gas is directed towards the sprayed solution in the form of a jet, e.g. in order to intersect the sprayed solution.

In various embodiments, the second power supply can be a low voltage, high current AC power supply delivering an alternating current with a frequency between 1 kilohertz and 1 gigahertz.

In various embodiments, the conductive element having a plurality of windings may be helically wound, e.g. into a coil, and the heater device can be located within the inner width of such helically wound conductive element.

In further embodiments, the conductive element having a plurality of windings, such as a coil or spiral, can be nested inside a hollow-cylindrical heater device in order to facilitate and/or improve containment of stray electromagnetic radiation. This variant is conceivable for implementations where the spray capillary and the conductive element having a plurality of windings are not coaxial and not concentric.

In various embodiments, the conductive element having a plurality of windings can have windings that interleave and/or intertwine each other in opposite directions, such as having a first segment of windings helically spiraling forward, then turning, and a second segment of windings helically spiraling backwards in between the gaps between the windings of the first segment. This interleaved and/or intertwined winding forward and backward along the same path can cause electric fields to cancel long range and to radiate only in near proximity of the (doubly wound) wire. Such implementation would also reduce the impact of undesirable stray electromagnetic radiation.

In various embodiments, the heater device may be a hollow cylinder surrounding the spray capillary. Preferably, the hollow cylinder tapers at a front end near the tip of the spray capillary so that exiting heated gas intersects the sprayed solution. It is possible to configure the electrospray ion source such that the hollow cylinder (i) is conductive and contains straight or meandering channels for conducting the gas, (ii) is non-conductive and contains embedded metallic or otherwise conductive capillaries to conduct the gas, or (iii) contains non-conductive channels for the gas that have a conductive porous filling. It is particularly preferred that the conductive porous filling inside the non-conductive channels comprises one of (i) bunches of metal or otherwise conductive wool and (ii) pieces of porously sintered metal. The wool may be plated by an inert metal to avoid corrosion.

In various embodiments, the heater device can be a thin metallic or otherwise conductive plate with one or more channels to heat the gas, the thin plate having the form of a ring surrounding the spray capillary. Preferably, the conductive element having a plurality of windings has the form of a spiral and is located opposite the thin plate, likewise surrounding the spray capillary. The electrospray ion source may further comprise at least one capillary standing out from the thin plate which conducts heated gas in a direction of the sprayed solution. It is possible to configure the electrospray ion source so that the at least one capillary tapers radially inward such that the heated gas is conducted directly into the sprayed solution.

In a second aspect, the invention pertains to a spectrometer for investigating desolvated ions analytically, such as a mass spectrometer, an ion mobility spectrometer or a combination of both, which receives the desolvated ions from an electrospray ion source, the electrospray ion source having a spray capillary supplied with a spray solution, which may be received from an upstream substance separator, such as a liquid chromatograph or an electrophoresis device, a first power supply for the generation of an electric drawing field at a tip of the spray capillary for establishing conditions for electrospraying, and a supply of gas which is instrumental in the generation of desolvated ions, and further comprising a heater device through which the gas is conducted towards the sprayed solution, a conductive element having a plurality of windings, such as a coil or spiral, near the heater device, and a second power supply connected to the conductive element having a plurality of windings to generate heat in the heater device by electromagnetic induction in order that the gas is heated while passing the heater device on its way to the sprayed solution.

In a third aspect, the invention relates to a method for heating a gas in an electrospray ion source used for investigating samples analytically, which gas is instrumental in the generation of desolvated ions as part of the electrospraying of an analyte solution, wherein the gas passes, and receives heat from a heating device which is heated without contact by electromagnetic induction.

In various embodiments, the gas can be an inert desolvation gas which is directed into a spray plume upon being heated.

In various embodiments, the method may further comprise controlling the temperature of the gas by varying operating conditions of a power supply used to effect the electromagnetic induction. Preferably, the operating conditions of the second power supply are adapted to a time characteristic of the analyte solution to be investigated analytically. It is particularly preferred that the adaptation of the operating conditions follows the time characteristic of the analyte solution during a substance separation run, such as a liquid chromatography run or electrophoresis separation run, the eluent of which is delivered as the analyte solution to the electrospray ion source.

BRIEF DESCRIPTION OF THE FIGURES

The invention can be better understood by referring to the following figures. The components in the figures are not necessarily to scale, emphasis instead being placed upon illustrating the principles of the invention (often schematically). In the figures, like reference numerals may designate corresponding parts throughout the different views.

FIGS. 4 and 5 present a thin plate heating device (21) in top view (FIG. 4) and from the side (FIG. 5), with channels (23), carrying the gas that is instrumental in the generation of desolvated ions from entrance (24) at the back side through a ring channel (22) in the plate to the exit capillaries (26) at the front side. The gas channels may be produced by photochemical etching or other suitable techniques inside two flat plates which are then bonded together bifacially, or by soldering or otherwise bonding metal or otherwise conductive capillaries to a flat metal or otherwise conductive plate. The thin annular plate surrounds the spray capillary (25) and, due to its short coaxial extension, transfers only little heat to the spray capillary and the analyte solution transmitted therein, the exposure of which to heat is generally undesired.

FIG. 6 shows the conductive flat spiral (27) which may be located opposite the back side of the thin plate (21) and used to heat the thin plate (21) from FIG. 4.

DETAILED DESCRIPTION

Figure 1A:
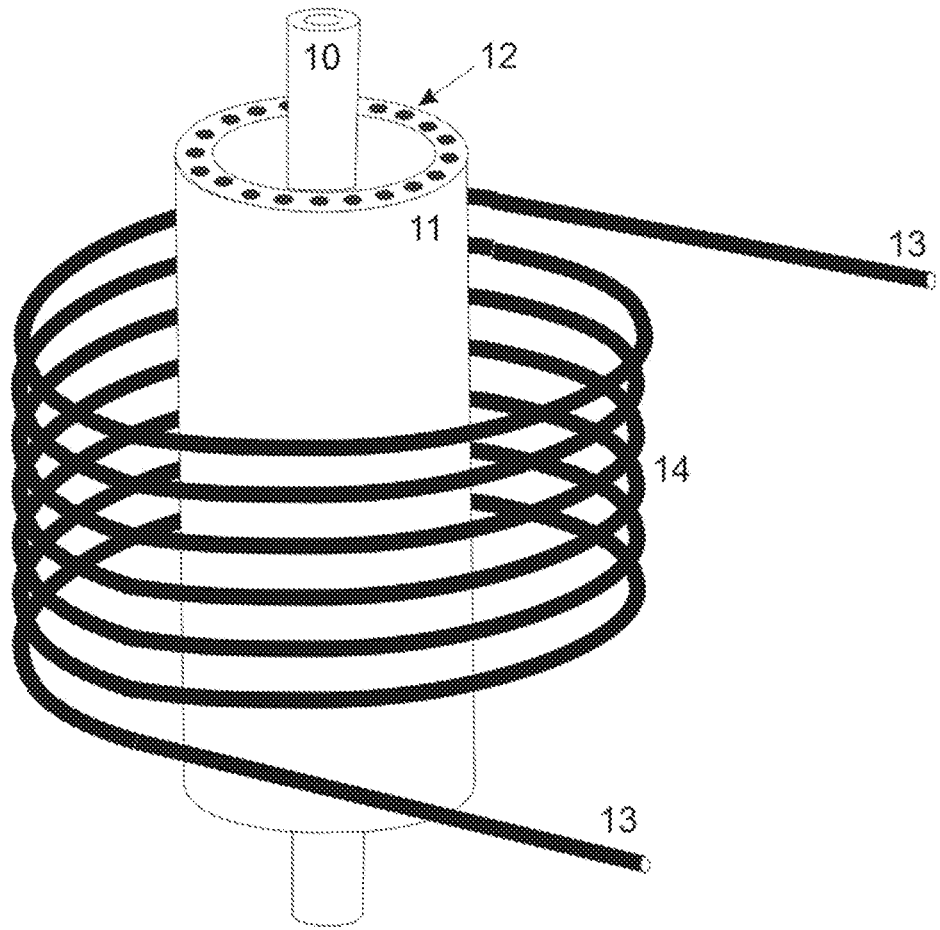
FIG. 1A schematically presents the basic principle of the invention. A conductive element having a plurality of windings, here a coil (14), operated with an AC voltage in the kilohertz to gigahertz range, induces heat within the surface of a metallic or otherwise conductive cylinder (11) of suitable electric conductance. A gas instrumental in the generation of desolvated ions, such as a desolvation gas, and pressed through the channels (12) of the cylinder (11), is thereby heated. The gas, e.g. nitrogen, is accelerated (not shown) towards the droplet plume generated at the tip (not shown) of the spray capillary (10), surrounding this plume.

While the invention has been shown and described with reference to a number of different embodiments thereof, it will be recognized by those of skill in the art that various changes in form and detail may be made herein without departing from the scope of the invention as defined by the appended claims.

As briefly described above, the invention provides a method to heat a gas instrumental in the generation of desolvated ions as part of the electrospraying process without any mechanical or electrical contact between the heating power supply and the heater itself, using rather electromagnetic induction. A small conductive element having a plurality of windings, such as a short coil or flat spiral with only a few windings, is supplied with a low voltage, high current AC in the frequency range from about 1 kilohertz to 1 gigahertz, heating a metallic or otherwise conductive heater device inside a helically wound conductive element or near a flat or planar conductive element having a plurality of windings (e.g. spiral). The heat is generated within the material near the surface of the heater device by eddy currents induced by the alternating electromagnetic field. The eddy currents at the same time attenuate the electromagnetic field, so that it penetrates only a short way into the heater material. The field inside a metallic heater drops down exponentially; the depth of penetration until the field is fallen to 1/e (37%) is called "skin depth" or "effective depth". As an example, a 50 kilohertz electromagnetic field produces a skin depth of 0.3 millimeter in a copper surface. For higher frequencies ω, the skin depth becomes thinner by $1/\sqrt{\omega}$ (one over square root omega); for other materials with other electric resistivities ρ, the skin depth becomes thicker by $\sqrt{\rho}$ (square root rho). In ferromagnetic materials, heat is additionally generated by losses due to magnetic hysteresis.

The conductive element having a plurality of windings should be made from a material with low resistivity. It may be produced by a tube to have the possibility to cool it by a flow of cooling fluid, such as liquid or gas. It can also be made from Litz wire to reduce impedance losses and undesirable excess heating of the coil.

The heater device can be arranged inside a helically multiply wound conductive element, such as a coil, and may surround concentrically the spray capillary, however without any mechanical contact (self-contained). The heater device may contain channels for the gas to be heated. The gas should be an inert gas such as, for instance, pure nitrogen. The heated gas then may be blown as a desolvation gas into the cloud of spray droplets generated at the tip of the spray capillary. The desolvation gas should help to dry the droplets so that finally desolvated charged analyte molecules remain which can be investigated analytically in a downstream mass spectrometer, ion mobility spectrometer or a combination of both.

Inductive heating has the following advantages: The heating is very efficient and the heat is generated only where needed with minimum losses. The heater may be made very compact lowering the spatial requirement for such ion source. This also entails a low-thermal mass heating channel that can be heated or cooled very quickly, such that the heating temperature can be programmed within the time scale of chromatography separation to selectively optimize desolvation of each compound as they elute. Only the surface of the heater up to the skin depth is effectively exposed to the alternating electromagnetic fields. Current heater arrangements used in known electrospray ion sources can be greatly simplified thereby.

There are several possible embodiments for the form of the heater.

Figure 1B:
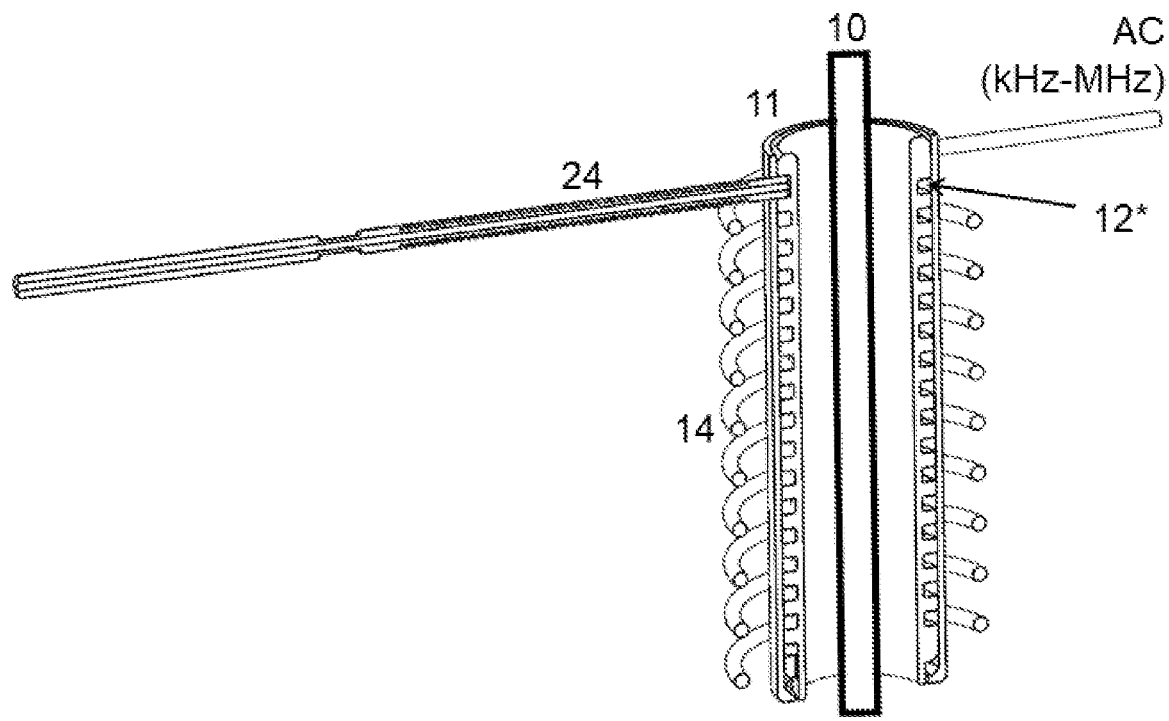
FIG. 1B illustrates a slight variation of the basic design from FIG. 1A in that the gas channel (12*) in the wall of the cylinder (11) does not extend in parallel to the longitudinal axis of the cylinder (11) but meanders around it, e.g. helically (thread-like). A gas feed (24) supplies gas to this meandering channel (12*) in the wall of the cylinder (11) where it is heated by the eddy currents induced in the cylinder wall material by surrounding helically multiply wound conductive element, here coil (14), before it exits the meandering channel (12*) at the opening(s) in the bottom front side of cylinder (11).
Figure 2:
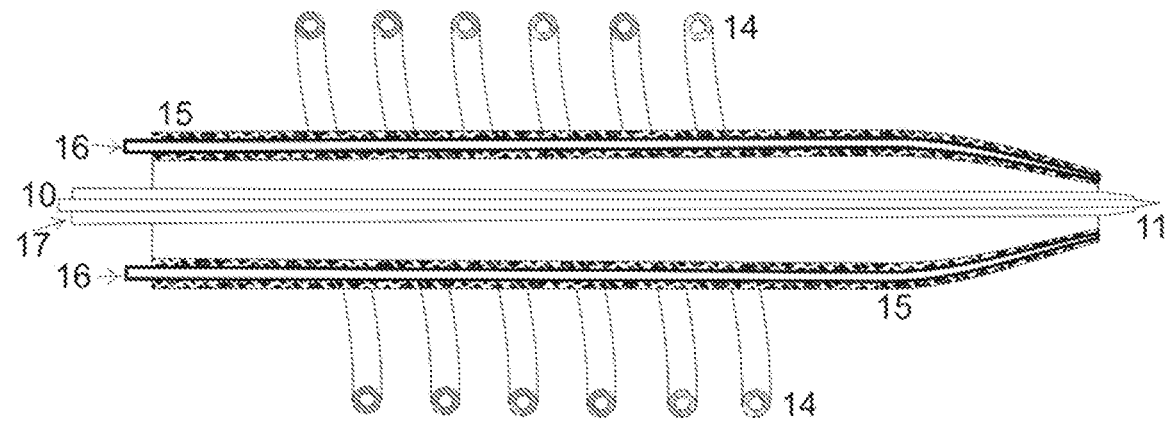
FIG. 2 depicts an embodiment, in which a bundle of metal or otherwise conductive capillaries (16), embedded in a ceramic or otherwise non-conductive block (15), is heated by induction from surrounding conductive element having a plurality of windings, here coil (14). The gas that is instrumental in the generation of desolvated ions is pressed through the metal capillaries (16) and thereby heated. The exiting gas is blown as desolvation gas into the spray plume of droplets, generated at the tip (11) of the spray capillary (10). The spray capillary is concentrically surrounded by a tube carrying a nebulizing gas (17) towards the tip (11) of the spray capillary (10).
Figure 3:
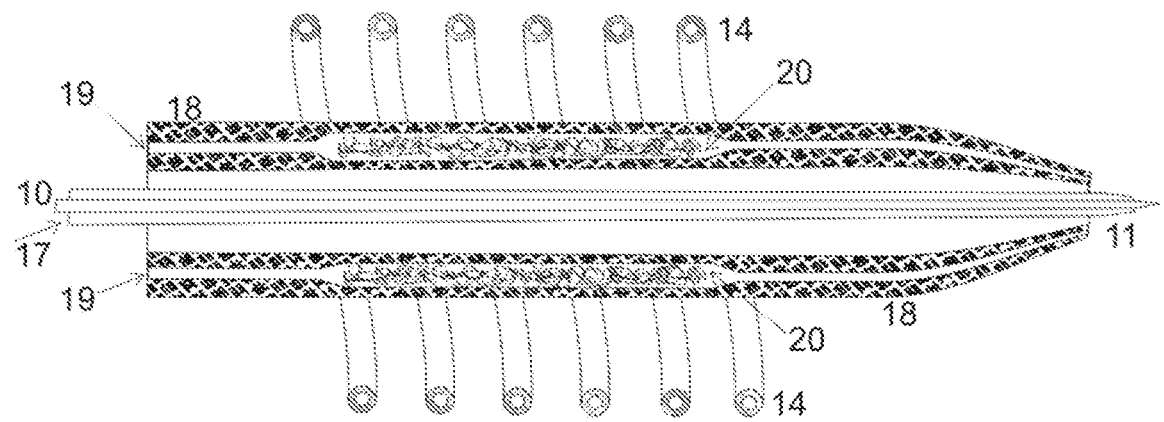
FIG. 3 shows a slightly different embodiment of the invention. The non-conductive gas channels (19) in the ceramic or otherwise non-conductive block (18) each contain a bunch of metal or otherwise conductive wool (20). The wool is inductively heated by an AC current in the kilohertz-megahertz range in coil (14). The wool, e.g. steel wool, may be gold plated to lower the risk of chemical corrosion.
Figure 7:
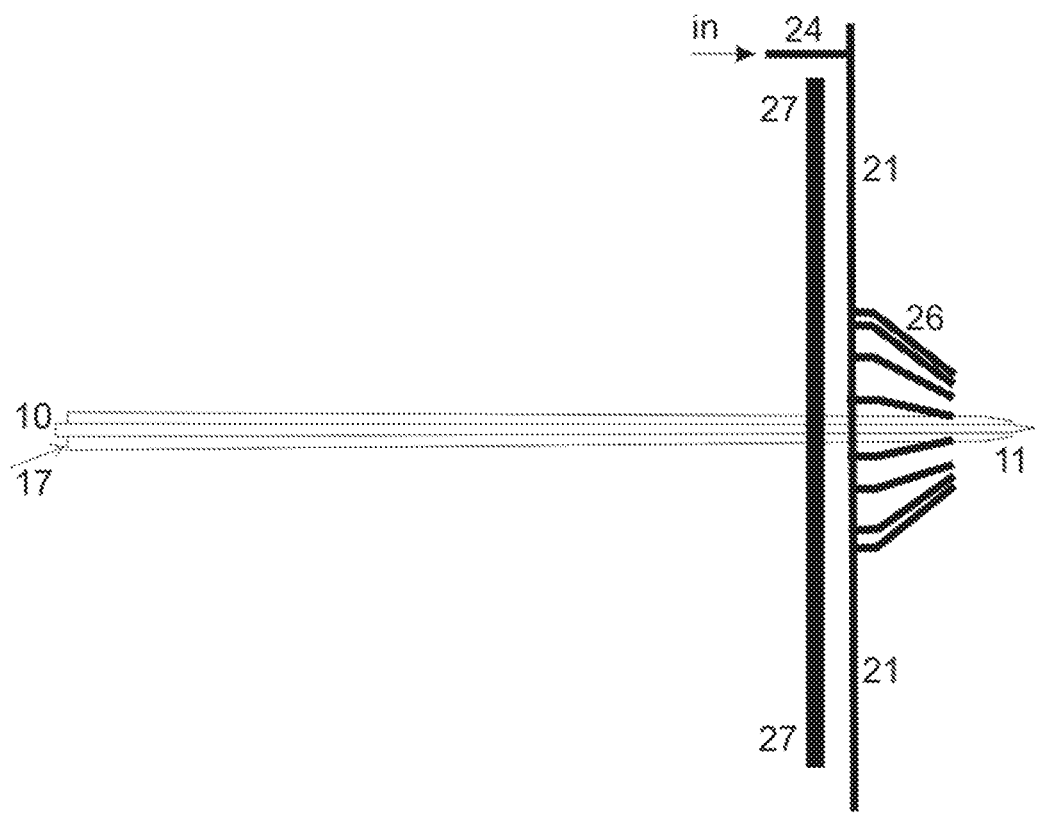
FIG. 7 shows the arrangement of the spiral (27), the thin plate (21), and the exit capillaries (26) with tapering configuration in this case with respect to spray capillary (10, 11), in order that the heated gas exiting from the exit capillaries (26) directly intersects with the spray plume (not shown) of the sprayed solution immediately after emanating from capillary tip (11).
Figure 8:
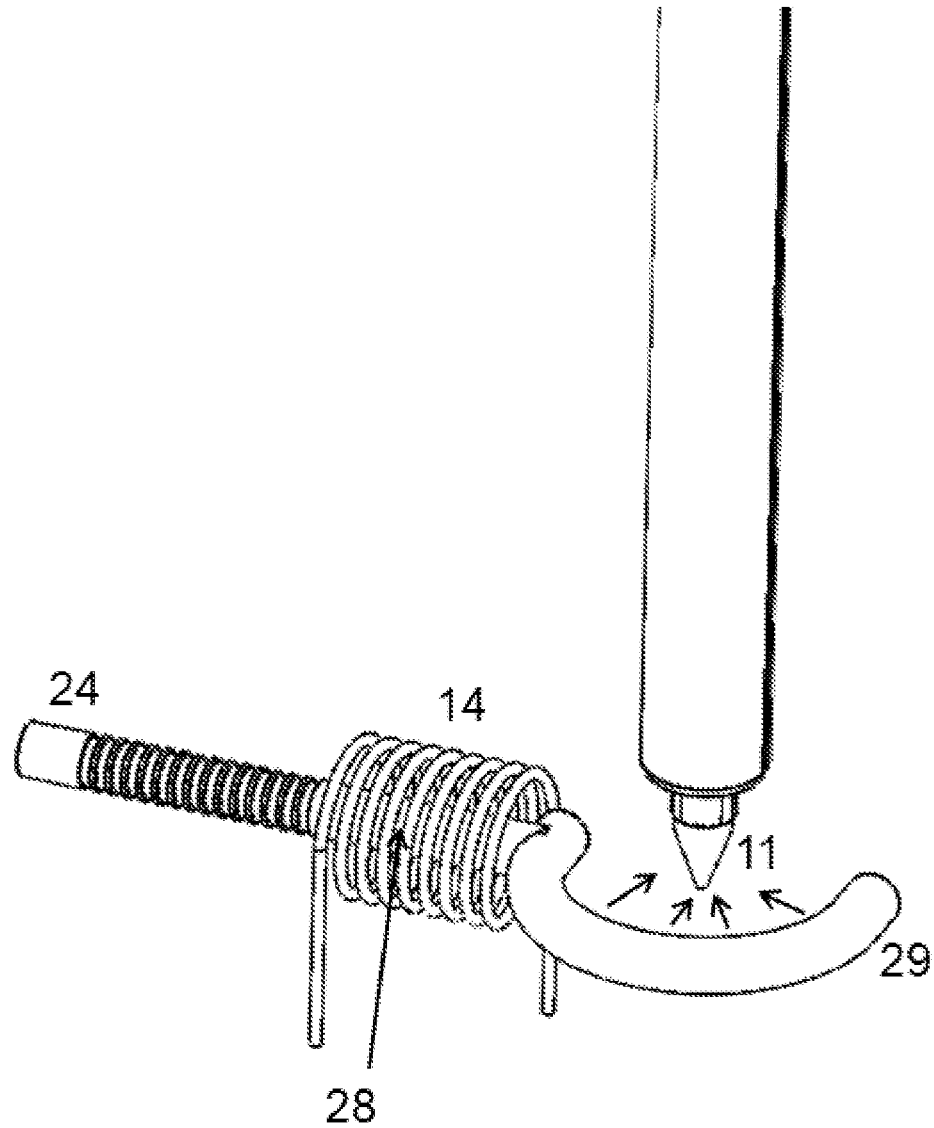
FIG. 8 presents an embodiment where the conductive element having a plurality of windings (14) is not arranged coaxially and concentric with the spray capillary but rather offset and roughly perpendicular thereto.
Figure 9:
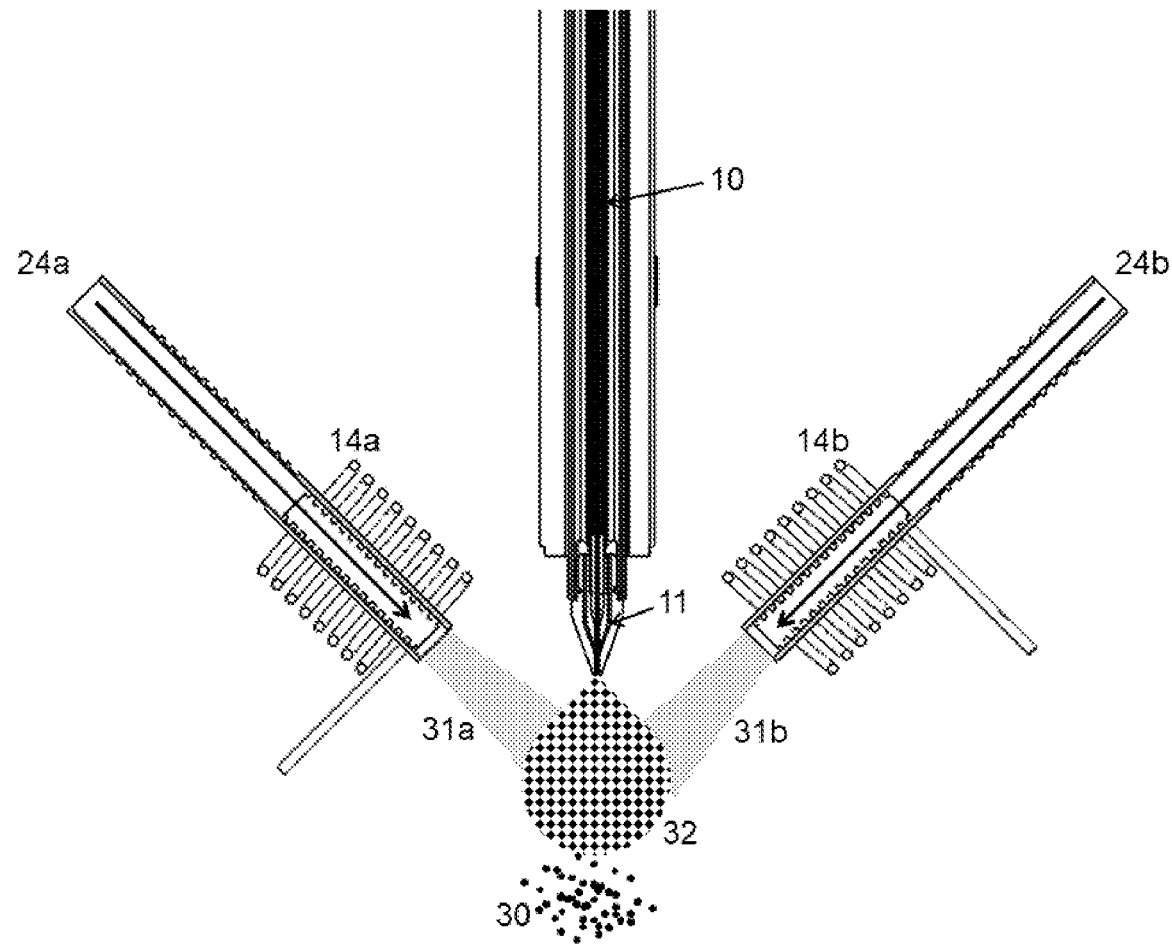
FIG. 9 illustrates a further embodiment where more than one conductive element having a plurality of windings (14a, 14b), likewise located offset from the assembly containing the spray capillary (10), is used to heat more than one flow of gas instrumental in the generation of desolvated ions (30), fed in through more than one gas feed (24a, 24b). Two heated gas beams (31a, 31b) are directed to intersect the spray plume (32) emanating from the spray capillary tip (11).

In a first embodiment, the heater device is simply a metallic or otherwise conductive hollow cylinder within the inner width of a helically multiply wound conductive element as shown in FIG. 1A. The metallic cylinder holds straight bores arranged in parallel, serving as gas channels. In special embodiments, the gas channels may not be straight but wind or otherwise meander through the cylinder wall, e.g. helically (FIG. 1B). The hollow cylinder may be produced by two hollow cylinders which are nested together concentrically after the channels have been milled into the outer surface of the inner hollow cylinder and/or inner surface of the outer hollow cylinder. Alternatively or additionally, the heater may be produced by additive manufacturing (3-D printing). The hollow cylinder may taper in diameter and blow the gas as desolvation gas directly into the droplet cloud (FIGS. 2 and 3), or the heated gas exiting the bores and channels of the cylinder can be conducted by tapering capillaries as desolvation gas to the cloud of droplets near the tip of the spray capillary (FIG. 7).

In a second embodiment, the heater may be reduced to a bundle of metal or otherwise conductive capillaries serving as the gas channels. The capillaries may freely run through the inner width of the coil (14). In a preferred embodiment, the capillaries (16) are embedded in a ceramic or otherwise non-conductive hollow cylinder (15), as shown in FIG. 2. The heated gas is blown as desolvation gas directly into the spray plume with droplets, generated at the tip (11) of the spray capillary.

In a further embodiment, the gas is conducted within non-conductive channels (19) in a ceramic or otherwise non-conductive hollow cylinder (18), and the heating is performed by a metallic or otherwise conductive material within the channels, such as a conductive porous material, e.g. by bundles of metal wool (20), as presented in FIG. 3. The wool, e.g. steel wool, may be protected from corrosion by plating with an inert material, e.g. by gold or nickel plating. The diameter of the filaments of the wool should be optimized for good heating efficiency.

In a further embodiment, the heating device is a thin metallic or otherwise conductive plate (21) with gas channels (23) for conducting the gas to be heated, as presented in FIGS. 4 and 5, heated by an adjacent conductive flat spiral shown in FIG. 6. The thin heating device (21) has the form of a ring and surrounds the spray capillary (25), thereby, due to its short coaxial extension, transferring only very little heat to the spray capillary and the analyte solution transmitted therein, the exposure of which to heat is generally undesired. The gas channels (23) may be milled, etched or simply pressed into a first metal plate, and then closed by a second thin metal plate bonded bifacially thereto, or the gas channels may be metal or otherwise conductive capillaries soldered or otherwise bonded to one face of a thin metal plate. In FIG. 7, the arrangement of the flat spiral (27), the thin plate (21) with entrance capillary (24) and exit capillaries (26) with a tapering configuration in this case is shown in relation to the spray capillary (10) and tip (11).

This embodiment with a thin plate, heated by an adjacent conductive flat spiral, can be produced in such a way that the heater arrangement shows extremely little heat capacity due to low thermal mass. Such a device can be heated and cooled very rapidly; heating by induction from the flat spiral, and cooling by constantly supplied fresh gas. The device allows adjusting the temperature of the gas to the characteristics of the analyte ions generated by electrospraying. In a liquid chromatography run whose eluent is input to the electrospray ion source as analyte solution, or any other substance separation run, such as an electrophoresis separation run, the successively eluting analytes may be more or less sensitive to thermal fragmentation, and the temperature of the gas may be controlled accordingly in order to reduce the heat stress as much as possible.

Another alternative embodiment, shown in FIG. 8, departs from a concentric alignment of the spray capillary with the channel guiding gas to be conductively heated. The assembly including the spray capillary with its tip (11) pointing downwards, and optionally comprising concentric conduit(s) for nebulizing gas, illustrated in FIG. 8 extends in a largely vertical direction, whereas the gas feed (24) extends roughly perpendicular to the spray axis in a plane encompassing the capillary tip (11) and has two end segments (28, 29) arranged in series. The first upstream segment (28) is surrounded by a helically multiply wound conductive element (14) and inductively heated so that heat is passed on to the gas flowing in the interior. The second downstream segment (29) functions as the discharge element for the heated gas and has a semi-annular form in the embodiment shown, the notional center of the annulus or ring roughly coinciding with the position of the spray capillary tip (11). Openings on the inner side of the half ring segment (not shown) guide and direct the heated gas toward the sprayed solution, e.g. nozzle-like, thereby assisting in the generation of desolvated ions from the electrospray droplets exiting from the tip (11). Modifications of this design are possible, for example, in that the partly annulus- or ring-shaped segment (29) covers an angular range different from 180°, such as less, e.g. a quarter segment, or more up to almost 360°, resembling the shape of the letter C or a chain element. It is also possible to displace the tip (11) of the spray capillary moderately up or down from the position within the plane of the half ring-shaped segment (29) shown in FIG. 8.

FIG. 9 illustrates a further embodiment where more than one conductive element having a plurality of windings, here coils (14*a*, 14*b*), likewise located offset from the assembly containing the spray capillary (10), is used to heat more than one flow of gas instrumental in the generation of desolvated ions (30), fed in through more than one gas feed (24*a*, 24*b*). Two heated gas beams (31*a*, 31*b*) are directed to intersect the spray plume (32) emanating from the spray capillary tip (11) in order to assist in the desolvation. The gas feeds (24*a*, 24*b*) have to comprise electrically conductive material only where they are surrounded by the coils (14*a*, 14*b*). Further upstream, they can comprise nonconductive material.

The invention has been illustrated and described with reference to a number of different embodiments thereof. It will be understood by those of skill in the art that various aspects or details of the invention may be changed, or that different aspects disclosed in conjunction with different embodiments of the invention may be readily combined if practicable, without departing from the scope of the invention. Furthermore, the foregoing description is for the purpose of illustration only, and not for the purpose of limiting the invention, which is defined solely by the appended claims and is meant to include any technical equivalents, as the case may be.

The invention claimed is:

1. A method for heating a gas in an electrospray ion source used for investigating samples analytically, which gas is instrumental in the generation of desolvated ions as part of the electrospraying of an analyte solution, wherein the gas passes, and receives heat from, a heating device which is heated without contact by electromagnetic induction, further comprising controlling a temperature of the gas by varying operating conditions of a power supply used to effect the electromagnetic induction, wherein the operating conditions of the power supply are adapted to a time characteristic of the analyte solution to be investigated analytically.

2. The method for heating a gas according to claim 1, wherein the gas is an inert desolvation gas which is directed into a spray plume emanating from a tip of a spray capillary of the electrospray ion source upon being heated.

3. The method for heating a gas according to claim 2, wherein the gas is directed to intersect the spray plume.

4. The method for heating a gas according to claim 1, wherein the heated gas is directed towards the sprayed solution in the form of a jet.

5. The method for heating a gas according to claim 1, wherein the gas is heated to a temperature between 300° C. and 500° C.

6. The method for heating a gas according to claim 1, wherein the adaptation of the operating conditions follows the time characteristic of the analyte solution during a substance separation run, the eluent of which is delivered as the analyte solution to the electrospray ion source.

7. The method for heating a gas according to claim 6, wherein the substance separation run is a liquid chromatography run or an electrophoresis separation run.

8. The method for heating a gas according to claim 1, wherein the power supply is an AC power supply delivering an alternating current with a frequency between 1 kilohertz and 1 gigahertz.

9. The method for heating a gas according to claim 1, wherein electromagnetic induction is generated using a conductive element which is helically wound, the heating device being located within the inner width of the helically wound conductive element.

\* \* \* \* \*